Nov. 14, 1933.  J. E. OTIS, JR  1,934,877
LUBRICANT RESERVOIR AND DASH PUMP
Filed Nov. 15, 1929
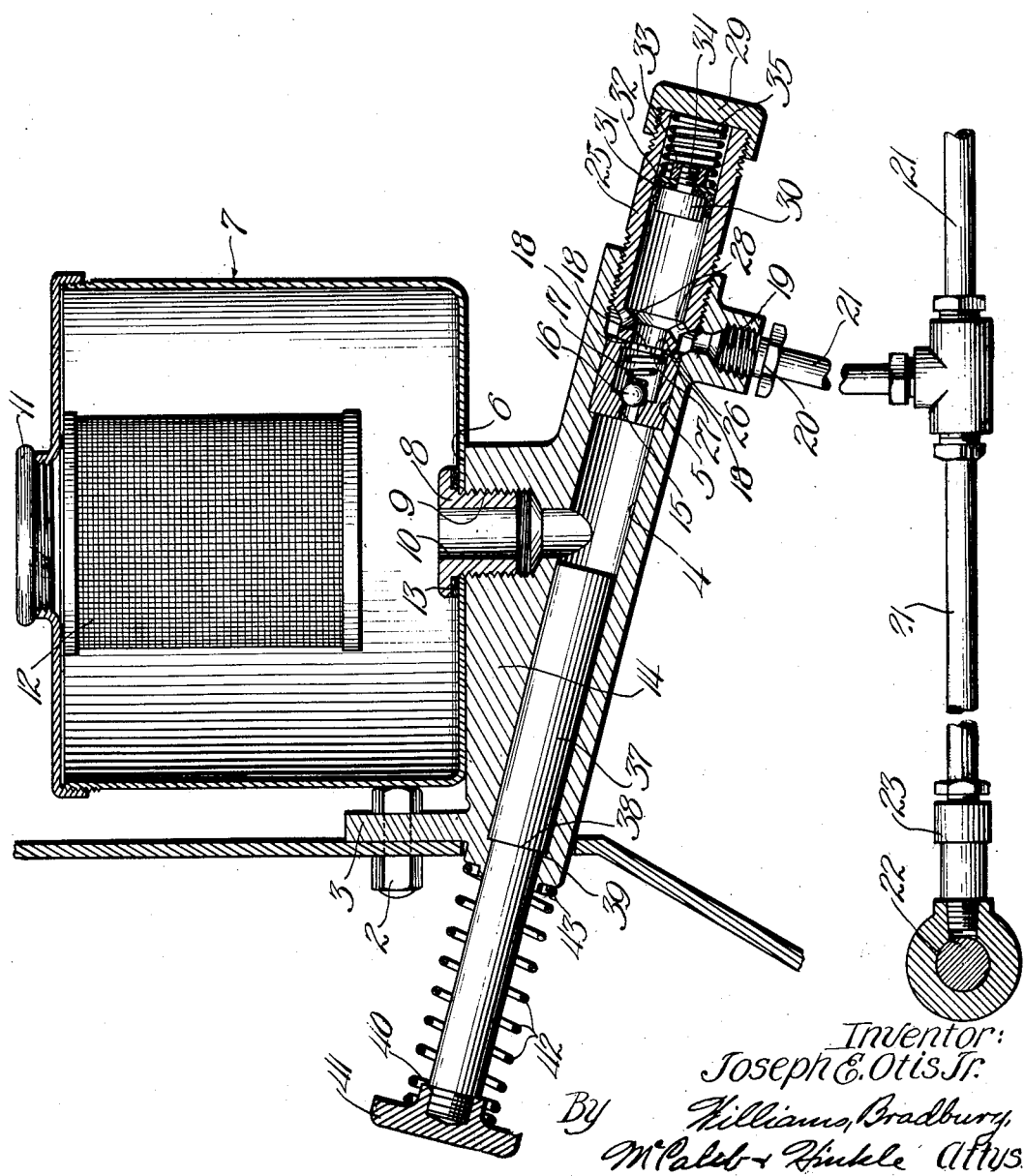
Inventor:
Joseph E. Otis Jr.
By Williams, Bradbury,
McCaleb & Hinkle Attys.

Patented Nov. 14, 1933

1,934,877

UNITED STATES PATENT OFFICE 1,934,877

LUBRICANT RESERVOIR AND DASH PUMP

Joseph E. Otis, Jr., Winnetka, Ill., assignor to Alemite Corporation, Chicago, Ill., a corporation of Delaware Application November 15, 1929
Serial No. 407,367

7 Claims. (Cl. 184—7)

My invention relates to a lubricant reservoir and pump unit for use in the so-called centralized systems of lubrication for lubricating a plurality of bearings from a single source. Lubricating systems of the centralized type comprise in general a source of lubricant supply, means for forcing the lubricant from the source of supply through branched conduits to the bearings to be lubricated, and metering means in the conduits and adjacent the bearings to control the quantity of lubricant supplied to each bearing. Centralized lubricating systems are now being extensively used to lubricate the chassis bearings of automotive vehicles, and my invention is particularly designed for use with the centralized lubricating systems applied to such vehicles.

An object of my invention is to provide an improved combined reservoir and manually operated pump for use as a part of the centralized lubricating system of automotive vehicles.

Another opject of my invention is to provide a combined reservoir and manually operated pump for use as a part of a centralized lubricating system, which pump includes means for storing a quantity of lubricant to be subsequently fed to the bearings.

Another object of my invention is to provide a combined reservoir and manually operated pump for use with a centralized lubricating system having means to automatically feed lubricant to the system after the pump has charged the system.

Another object of my invention is to provide a combined reservoir and pump in which the pump cylinder, mounting bracket and reservoir support are one piece.

Another object of my invention is to provide a combined reservoir and pump which is simple in construction, economical to manufacture, and reliable in operation.

Other objects and advantages will become more apparent from the following detailed description and accompanying drawing, in which The figure is a sectional elevation of the combined pump and reservoir of my invention and also shows a feed pipe connection to a bearing to be lubricated.

Referring now to the drawing, I have illustrated my new and improved device as attached to the dash of an automotive vehicle, the operating plunger extending through to the driving compartment while the reservoir is mounted in the engine compartment. The combined lubricant reservoir and pump unit which constitutes my invention is attached to the dash by bolts 2 and bracket 3 which forms a part of the unitary casting 14 having a pump cylinder 4 communicating with an enlarged bore which contains a valve chamber 5. A base 6 is also formed at the top of the casting for supporting a lubricant container or reservoir 7 which is secured thereto by a screw plug 8 screw threaded into a passage 9 in the unitary casting which connects with the pump cylinder 4. The screw plug 8 has a bore 10 which allows lubricant to flow from the container 7 to the pump cylinder 4.

The lubricant container or reservoir 7 is provided with a suitable cap 11 which, when removed, allows filling of the container. A strainer 12 is suitably mounted within the container to remove any grit or foreign substance which might flow into the container. A felt washer 13 is disposed between the screw plug 8 and the bottom of the container to provide a leak-proof connection.

The valve chamber 5, which is disposed within the enlarged bore at the lower end of the pump cylinder 4, contains a port 15, the inner edge of which provides a valve seat for a ball check valve 16 which is maintained on its seat by a spring 17 which is seated upon crimped edges 18 within the valve chamber 5 or secured therein in any other suitable manner. A boss 19 is formed at the bottom side of the unitary casting in which is screw threaded a suitable pipe connection or union 20 providing a leak-proof connection with a pipe or feed line 21 into which the lubricant is discharged and fed to bearings 22 located at various parts about the automotive vehicle. Each of these bearings is provided with a metering unit 23 which apportions the lubricant between the bearings.

A cylinder 25 is screw threaded in the lower end of the unitary casting 14 and is reduced at one end to form a collar 26 having a central opening 27 therein to allow lubricant to pass from the valve chamber 5 into the interior of the cylinder 25. Ports 28 are provided in the collar 26, allowing lubricant to flow out of the interior of the cylinder 25 and into the feed or pipe lines 21. The opposite end of the cylinder is closed by a screw cap 29.

A piston 30 is provided having a suitable cup leather washer 31 which is backed by a metal washer 32, the parts being held together by a nut 33 which is screw threaded on the stem 34 of the piston 30. The piston reciprocably mounted within the cylinder 25 is urged toward the collar 26 by means of a compression spring 35.

A pump plunger 37 is reciprocably mounted in the upper end of the pump cylinder 4 and is reduced at 38 to engage a shoulder 39 which is formed at the end of cylinder 4 and prevents withdrawal of the plunger 37. The outer end of the latter is screw threaded at 40 to receive a head or pedal 41. A compression spring 42 is disposed between the pedal 41 and a shoulder 43 formed on the outer end of the casting 14, which spring tends to hold the pump piston 37 in withdrawn position with its shoulder 38 abutting the shoulder 39.

In the operation of my device the container 7 is filled with lubricant by removing the cap 11, the lubricant flowing into the container through the strainer 12 and on through the bore 10 in the screw plug 8 into the pump cylinder 4, the plunger 37 being held normally in a withdrawn position by the spring 42. The operator now presses the pedal 41 downwardly with his foot or hand, which forces the plunger 37 past the passage 9, acting as a valve to close this passage and prevent return of lubricant from the pump cylinder 4 to the container 7. As the plunger 37 descends, the lubricant will be forced through the port 15, unseating the ball check valve 16 and forcing the lubricant into the interior of the storage cylinder 25, which action will compress the spring 35 and force the piston 30 downwardly to the position shown in the drawing.

A continued movement of the plunger 37 will completely fill the interior of the chamber 25 or a second stroke of the pump piston 37 will thus fill the cylinder 25, whereupon the lubricant will be forced through the ports 28 and feed lines 21 to the metering devices 23 to be subsequently fed to the bearings 22.

It will be seen that when the operator releases the pressure from the pedal 41 of the plunger 37, the spring 42 will return the plunger, thereby filling the pump cylinder 4 with a fresh charge of lubricant from the container 7 by means of suction and gravity flow. A continued pumping action of the plunger 37 will force lubricant through the feed lines 21 to all parts of the vehicle and to all of its bearings. When the system has thus been filled with lubricant and the plunger 37 returned to its withdrawn position as shown in the drawing, it will be noted that the sping 35 is compressed and the piston 30, located within the cylinder 25, is forced back, as shown in the drawing, by spring 35 and the lubricant entrapped in the interior of the cylinder 25 which cannot return to the reservoir 7 because of the ball check valve 16 is forced through feed lines 21 to the bearings.

Assuming that the system has thus been primed with lubricant and that the feed lines 21 are substantially filled with lubricant, depression of the pedal 41 in the manner above described forces lubricant into the storage chamber 25. Thereafter the spring 35 will gradually force the piston 30 to the left, discharging the lubricant in the cylinder 25 to the bearings through the feed lines and metering units. It will be understood that when the pump of my invention is used with a resistance unit system the resistance units retard the flow from the pump to such an extent that if the storage cylinder 25 were not provided it would make it necessary for the operator to hold his foot on the pedal 41 for an exceedingly long time in order to force a full charge of lubricant to the bearings. However, with the provision of the storage chamber the pedal may be rapidly depressed and the lubricant stored in the cylinder 25 from which it is fed gradually to the bearings.

The pump reservoir unit of my invention is primarily adapted for resistance unit systems but possesses advantages when used with a measuring valve system of lubrication. When used in the latter system the resilient storage chamber aids in securing the complete operation of the measuring valves and permits rapid operation of the pump plunger even in cold weather.

I have thus provided a unit in which the pump may be rapidly operated without interfering with the proper apportionment and feeding of the lubricant to the bearings. The pump and reservoir unit is exceedingly simple in construction and may be very economically manfactured.

The invention is capable of wide variation within equivalent limits and I contemplate such variation as may be desirable or useful in the particular adaptation of the invention shown, or in its adaptation to other apparatus. I do not restrict myself in any unessential particulars, but what I claim and desire to secure by Letters Patent is:

1. A combined pump and reservoir installation for a centralized lubricating system comprising a unitary casting adapted to be attached to the dashboard of an automobile, a lubricant reservoir mounted thereon, a transverse cylinder below said reservoir in said casting, a passageway between said reservoir and an intermediate portion of said cylinder, a spring-pressed plunger mounted in said cylinder normally uncovering said passageway, a check valve at the end of said cylinder, and a storage chamber beyond said check valve in communication with a supply conduit to the system.

2. A combined pump and reservoir installation for a centralized lubricating system comprising a unitary casting adapted to be attached to the dashboard of an automobile, a lubricant reservoir mounted thereon, a transverse cylinder below said reservoir in said casting, a passageway connecting said reservoir and said cylinder, a spring-pressed plunger mounted in said cylinder normally uncovering said passageway, a check valve at the end of said cylinder, a storage chamber beyond said check valve in communication with a supply conduit to the system, and a movable wall within said storage chamber.

3. A combined pump and reservoir installation for a centralized lubricating system comprising a unitary casting adapted to be attached to the dashboard of an automobile, a lubricant reservoir mounted thereon, a transverse cylinder below said reservoir in said casting, a passageway between said reservoir and an intermediate portion of said cylinder, a spring-pressed plunger mounted in said cylinder normally uncovering said passageway, a check valve at the end of said cylinder, and a storage chamber beyond said check valve having means therein for forcing lubricant under pressure through a supply conduit to the system.

4. A combined pump and reservoir installation for a centralized lubricating system comprising a unitary casting having a lubricant reservoir mounted thereon, a pump cylinder in said casting connected with said reservoir, a pump plunger reciprocable within said cylinder, a storage chamber disposed at one end of the pump cylinder and connected to the pump cylinder by a valved passageway, and a spring-pressed piston reciprocable within said storage chamber to discharge lubricant from said chamber after the pump plunger has been operated.

5. A supply unit for a centralized lubricating system comprising a cylinder having an inlet port in communication with a lubricant reservoir, an outlet port in communication with bearings to be lubricated, and a check valve disposed between said ports and dividing said cylinder into two portions, and a piston for each of said cylinder portions, each of said pistons being movable toward said valve for discharging lubricant from its respective portion of said cylinder.

6. In a supply unit for a centralized lubricating system whereby lubricant is fed to a plurality of bearings from a common source, a casting, a cylinder extending transversely of said casting, a lubricant reservoir affixed to said casting and in communication with said cylinder, a plunger for discharging lubricant from said cylinder, a tube affixed to said casting providing an extension to said cylinder and adapted to be charged with lubricant discharged from said cylinder, a valve chamber between said cylinder and said tube, and a spring pressed piston within said tube operable for discharging lubricant therefrom to the bearings to be lubricated.

7. A supply unit for a centralized lubricating system wherein lubricant is fed to a plurality of bearings from a common source comprising a casting having a pump cylinder extending transversely thereof, a reservoir affixed to said casting and connected with said cylinder, a pump plunger reciprocable within said cylinder for discharging lubricant therefrom, a tube affixed to said casting at the discharge end of said cylinder providing a storage chamber and connected to said cylinder by a valved passageway, an outlet from said storage chamber leading to the bearings to be lubricated, and a spring pressed piston effective for gradually discharging lubricant from said chamber.

JOSEPH E. OTIS, Jr.